Feb. 4, 1969    A. D. FELLENZER, JR    3,425,114
TRIPLEX CABLE SPREADING TOOL
Filed April 16, 1964    Sheet _1_ of 2
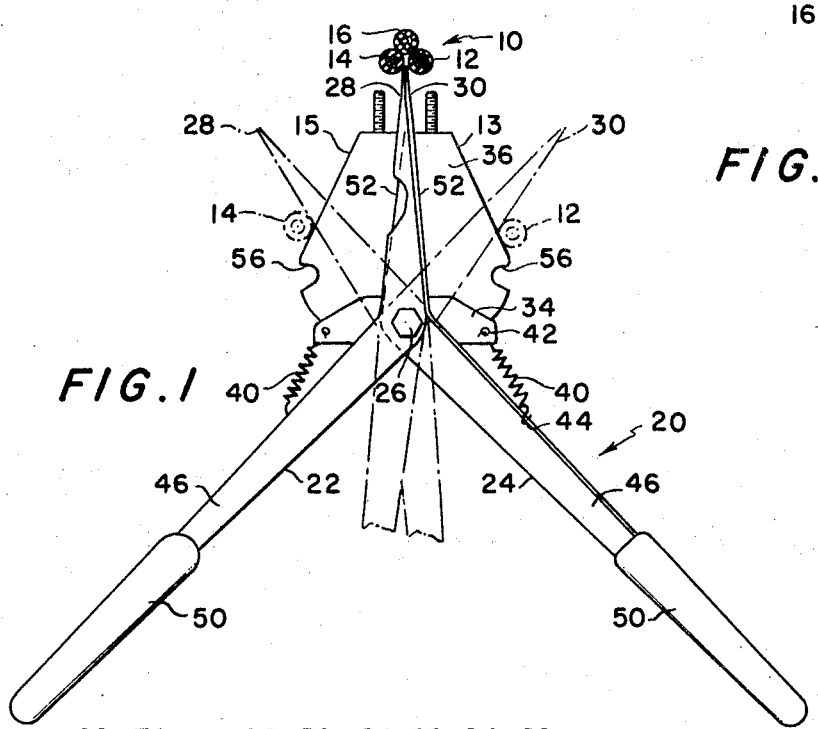
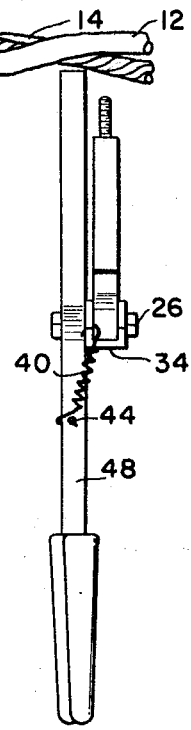
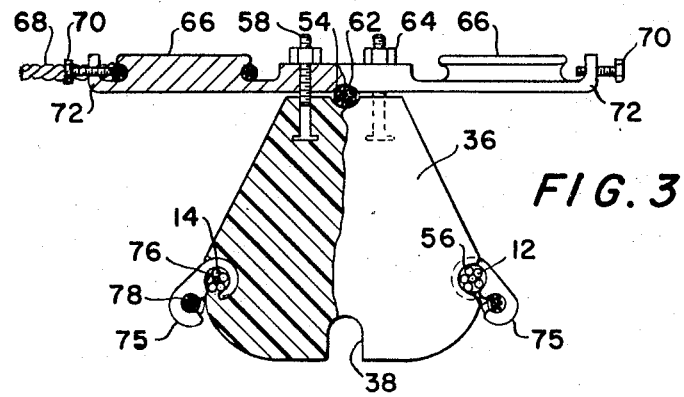
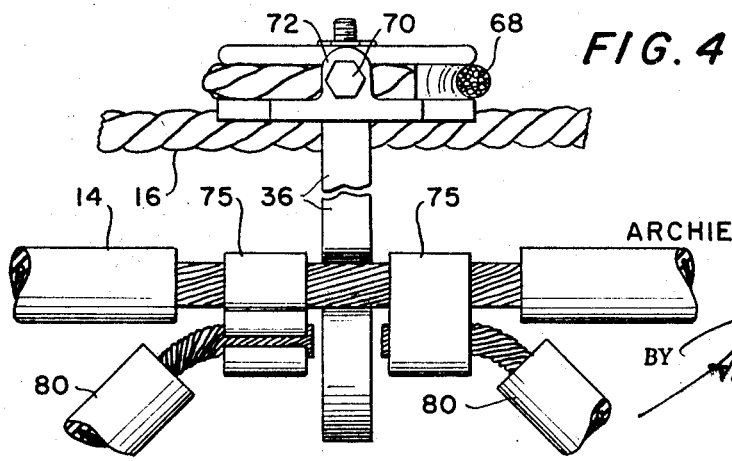
ARCHIE D. FELLENZER, JR.
INVENTOR.
BY *Howard H. Reiter*
ATTORNEY Feb. 4, 1969  A. D. FELLENZER, JR  3,425,114
TRIPLEX CABLE SPREADING TOOL
Filed April 16, 1964
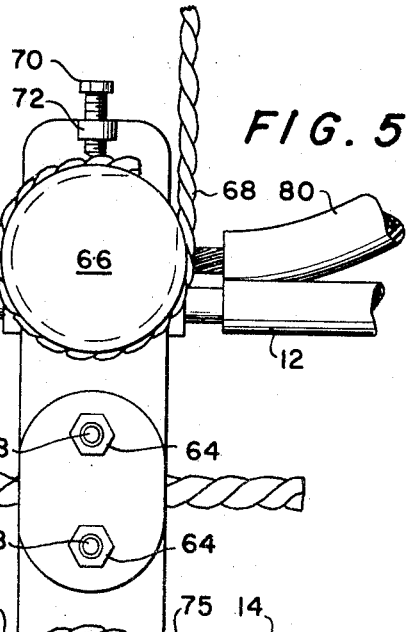
FIG. 5
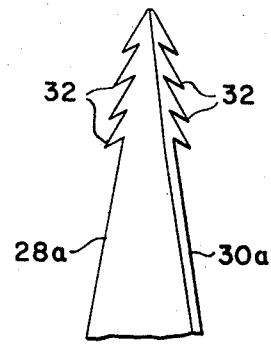
FIG. 7
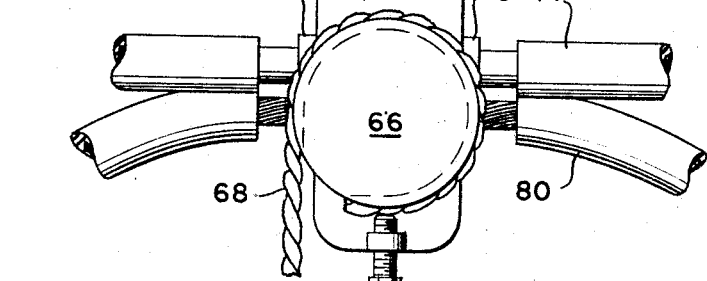
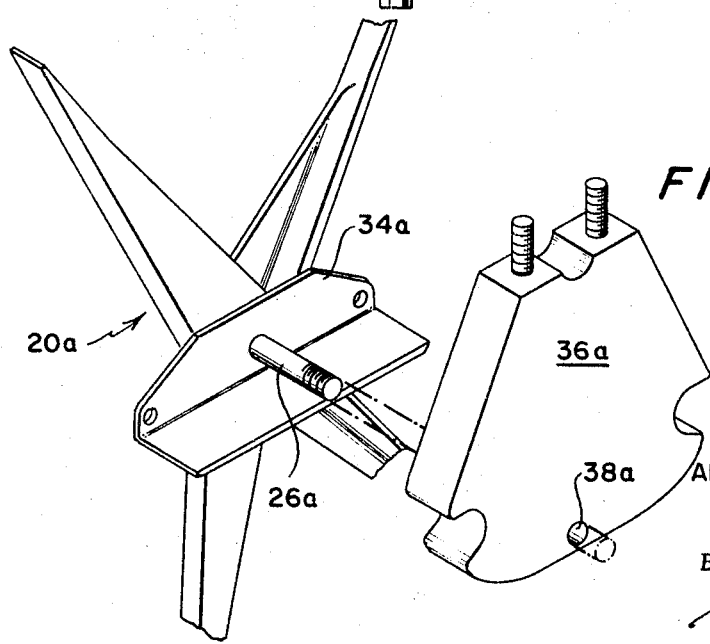
FIG. 6
ARCHIE D. FELLENZER, JR.
INVENTOR.
BY *Howard S. Reuter*
ATTORNEY United States Patent Office 3,425,114
Patented Feb. 4, 1969

3,425,114
TRIPLEX CABLE SPREADING TOOL
Archie D. Fellenzer, Jr., 11 Starhaven Ave.,
Middletown, N.Y. 10940
Filed Apr. 16, 1964, Ser. No. 360,264
U.S. Cl. 29—203                                     5 Claims
Int. Cl. H01r 43/04; H01b 13/00; B23p 19/04

This invention relates to the spreading apart of the individual conductors in a triplex cable for making electrical connections thereto.

Triplex cable generally comprises a twisted pair of insulated phase-conductors spiraled about a bare ground wire capable of supporting the cable. Such a cable is often suspended between poles in a distribution system where midspan service tap connections, which can be quickly and conveniently installed, are required.

To facilitate installation of these service taps, it is desirable to insert an insulating spacer between the three wires of the cable to keep them in spread position while connections are made.

One object of this invention is to provide a convenient and economical means for mechanically and electrically attaching triplex cable service taps to triplex cable runs in mid-span.

Other objects are to provide a simple means for spreading triplex wires for inserting a spacer therebetween, to provide a means for camming triplex wires into the wire seats in the spacer, and to provide means for supporting the spacer on the spreader tool, and for holding the spacer in proper position for seating the ground wire.

These and other objects and features of this invention will become more apparent by reference to the following description taken in conjunction with the accompanying drawings, in which:

FIG. 1 is a front plan view of a spacer for triplex cable being inserted between the wires of such a cable by a spreader tool in accordance with this invention;

FIG. 2 is a side elevation of the same;

FIG. 3 is a partly sectioned front plan view of a spacer in accordance with this invention positioned in a triplex cable and secured by an anchoring connector;

FIG. 4 is an enlarged side elevation of the spacer connections of FIG. 3;

FIG. 5 is a top plan view thereof;

FIG. 6 is a pictorial representation of a slightly modified spreader tool head, and a spacer aligned therewith prior to mounting; and FIG. 7 is a plan view of a modified form of spreader tips for entering the triplex cable.

Referring now in greater detail to the drawings, the triplex cable 10 comprises a pair of insulation covered phase conductors, 12 and 14, and a neutral wire 16 which is the ground and supporting conductor about which the twisted phase conductors are spiraled.

For use when it is desired to make a service drop connection to the cable between two supports (note shown), I have devised a special method of separating the spiraled conductors 12, 14 and 16 which are under substantial tension in a normal installation.

A spreader tool 20 is employed which may comprise a pair of levers 22 and 24 mounted on a pivot 26. The levers are devised, according to my method, to form an inserting pair of tips 28 and 30 at one end thereof which are streamlined for entering the narrow space between the individual conductors such as phase conductors 12 and 14. The tips may be serrated as at 32, as shown on tips 28a and 30a in FIGURE 7, to facilitate initial retention between the wires.

The outward sides 52 of the tips may otherwise be smoothly surfaced, beyond the serrated ends, to permit the insulated cables to slide easily during spreading.

Insulating hand grips 50 may be provided at the other end of levers 22 and 24 to facilitate use of the spreader, particularly on energized cables.

The spacer 36 which is to be inserted into the center of the cable to maintain the conductors in spread position, is roughly triangular in shape, with the apex formed into a seat 54 for receiving one conductor, and the two remaining corners being provided with seats 56 for seating the insulated phase conductors 12 and 14 as shown in FIG. 3. As is further shown in FIG. 3, the spacer is preferably formed of insulating material to maintain electrical isolation of the cable conductors.

During insertion, the spacer 36 is held in relatively fixed relation to the spreader to assure advancement into the center of the conductor spiral as the conductors are spread apart. This may be accomplished by a support such as U-shaped channel 34 which is shaped to seat one edge of the spacer 36 and is secured to the lever pivot point by passing pivot bolt 26 therethrough. A notch 38 formed in the spacer permits seating the spacer over the pivot bolt, and provides a lateral positioning guide to further assure proper seating.

Alternatively, as shown in FIG. 6, an L-shaped support 34a may be used, and the spacer 36a may be provided with an aperture 38a adapted to be axially slipped on to the pivot rod 26a. Separation of the spreader 20a from the spacer after insertion thus requires merely a slight transverse movement to withdraw the bolt from the aperture.

Support 34 is additionally secured and positioned relative to levers 22 and 24 by springs 40, which may be mounted at one end of the support through an aperture 42 therein, and at the other end through an opening 44 in the lever.

In operation, spacer 36 is seated in support 34, the lever tips 28 and 30 are forced against and between two of the conductors, such as 12 and 14, and the handles at 50 are brought toward each other as pressure is maintained in the direction of the cable. This action forces the conductors 12 and 14 first outward and then relatively downward along the inclined outer surfaces of the lever tips as shown in dot-dash position in FIGURE 1. Movement of the conductors in this fashion is aided by the camming action achieved by cooperation of the lever tips and the angled outer surfaces 13 and 15 of spacer 36.

As conductors 12 and 14 are moved downwardly along the opposite spacer sides, conductor 16 will be seated in spacer seat 54 as the result of the relative movement of the cable and spacer. Ultimately, conductors 12 and 14 will be forced over the upper edges of, and will seat themselves in, their respective seats 56 as a result of the tension forces in the cable tending to draw the spread-apart conductors together again. When all three cable conductors have been seated, the spacer may be removed by bringing tips 28 and 30 together to permit their being moved downwardly away from the spacer and cable between seated conductors 12 and 14. The spacer thus provides a simple highly convenient and relatively inexpensive tool for inserting a spacer between the conductors of a triplex cable.

The levers of the spreader may be simply formed of a pair of right-angle channel members, as shown in FIGURE 6, one of the two walls 46 and 48 of each channel being apertured to receive the pivot bolt 26 with the other wall forming the flat outer tip surfaces 52 which are inserted between the wires. The levers are angularly bent at the pivot point to form the shape shown in FIGURE 1, and a spacing washer (not shown) is placed on the bolt 26 between the opposed walls 46 of the two to align them transversely as shown in FIGURE 2. By bending the channel members at approximately 120° from their straight line state, the handles of the levers may be brought together to spread the tips by approximately the same amount.

To provide a firm anchorage for the inserted spacer, I have provided the spool grip connector 60 shown in FIGURES 3, 4 and 5. In that embodiment, the spacer 36 is preferably provided with bolts 58 which may be permanently embedded in the body of the spacer, one on each side of the ground wire seat 52 and extending outwardly.

The spool grip connector is preferably provided with a seat 62 for mechanically and electrically engaging the ground wire. A pair of apertures may be formed in the connector for receiving the spacer bolts 58. Nuts 64 tighten and secure the bolts, and thus the spacer and ground wire, to the connector 60.

Spools 66, formed integrally with the connector, may be employed for receiving the ends of a service tap ground wire 68. Such wires are wound around the spool, and the end snubbed by a set screw 70 mounted in a lug 72 extending from the connector base.

The spool grip connector may be provided with a pair of spools for multiple service tap connections, one on each side thereof for better balance.

The service tap connections are completed by exposing a small length of each of the phase conductors 12 or 14 and installing one or more compression connections 75 of well-known type having seats 76 and 78 for the service conductors 80, and the phase conductors 12 or 14. Such compression connectors may preferably be of the C-clamp type, formed of malleable conductive metal, which may be inserted over the endless phase conductor and compressed to form a secure tap connection with the tap lines.

The foregoing provides a safe, economical and convenient method of spreading and installing a permanent type of spacer in a triplex cable for enabling service tap connections to be made thereto. By affixing an anchoring connector to the spacer, and making it an electrical and mechanical part of the triplex cable system, service tap connections may be conveniently and quickly made to the triplex cable and secured safely thereto.

The connector spacer, and connections may be insulated with covers, taped, or left bare.

The invention has thus been described but it is desired to be understood that it is not confined to the particular forms or usages shown and described, the same being merely illustrative, and that the invention may be carried out in other ways without departing from the spirit of the invention; therefore, the right is broadly claimed to employ all equivalent instrumentalities coming within the scope of the appendant claims and by means of which objects of this invention are attained and new results accomplished, as it is obvious that the particular embodiments herein shown and described are only some of the many that can be employed to obtain these objects and accomplish these results.

I claim:
1. A spreader for placing a spacer in a triplex cable, comprising:
   a pair of levers mounted on a pivot;
   said levers terminating in pointed tips for insertion between the conductors of a triplex cable;
   said tips having smooth exterior surfaces for causing a pair of conductors to slide towards the pivot when the levers are spread apart;
   and, a holder means coupled to the spreader for supporting a cable spacer device thereon.
2. The spreader of claim 1, wherein the holder is a U-shaped clamp.
3. The spreader of claim 1, wherein the holder is mounted to the pivot.
4. The spreader of claim 1, wherein the holder is positioned relative to the spreader by a pair of springs mounted to a lever.
5. The spreader of claim 3, wherein the pivot extends through the holder for engagement with a spacer having an aperture.

References Cited
UNITED STATES PATENTS

| | | | |
|---|---|---|---|
| 1,178,404 | 4/1916 | Lloyd | 29—223 |
| 1,481,382 | 1/1924 | Monckmeier | 29—223 |
| 2,222,744 | 11/1940 | Gallien. | |
| 2,334,781 | 11/1943 | Maines | 81—5.1 |
| 2,616,315 | 11/1952 | Caldwell | 81—5.1 X |
| 3,174,723 | 3/1965 | McGuire | 254—131 |
| 1,686,583 | 10/1928 | Templeton | 29—461 |
| 2,294,091 | 8/1942 | Mahr | 29—461 |
| 3,095,468 | 6/1963 | Klein | 174—88 |
| 2,918,520 | 12/1959 | Stevens | 174—146 |
| 2,814,860 | 12/1957 | McCaleb | 29—268 |
| 891,061 | 6/1908 | Hansen | 81—302 |

CHARLIE T. MOON, *Primary Examiner.*

U.S. Cl. X.R.

29—203, 235, 239, 268, 451, 453; 174—146; 254—131